United States Patent [19]
White

[11] Patent Number: 5,237,945
[45] Date of Patent: Aug. 24, 1993

[54] WATER BARRIER FORMED FROM A CLAY-FIBER MAT

[75] Inventor: Alec W. White, Hoffman Estates, Ill.

[73] Assignee: American Colloid Company, Arlington Heights, Ill.

[21] Appl. No.: 677,005

[22] Filed: Apr. 2, 1991

Related U.S. Application Data

[63] Continuation-in-part of Ser. No. 628,497, Dec. 17, 1990, Pat. No. 5,174,231.

[51] Int. Cl.⁵ .................. B32B 7/08; D04H 1/46; E04C 1/00; C02F 1/42
[52] U.S. Cl. .................. 112/420; 28/112; 52/169.1; 52/309.11; 52/309.13; 52/309.14; 55/528; 55/DIG. 9; 112/262.1; 156/148; 156/279; 156/305; 156/308.2; 210/679; 210/688; 210/807; 210/502.1; 210/503; 210/507; 210/508; 210/901; 210/912; 264/109; 264/112; 264/123; 264/128; 405/38; 405/53; 405/107; 405/109; 405/115; 405/129; 405/270; 428/102; 428/206; 428/234; 428/235; 428/241; 428/244; 428/246; 428/283; 428/296; 428/300
[58] Field of Search .......... 405/53, 129, 270, 38, 405/107, 109, 115; 112/420, 262.1; 55/528; 52/169.1, 309.13, 309.14; 28/112; 156/148, 279, 305, 308.2; 210/502.1, 503, 507, 508; 428/102, 206, 234, 235, 241, 244, 246, 283, 296, 300

[56] References Cited

U.S. PATENT DOCUMENTS

| 4,423,109 | 12/1983 | Greenman et al. | 428/288 |
| 4,424,248 | 1/1984 | Tesch et al. | 428/172 |
| 4,429,001 | 1/1984 | Kolpin | 428/296 |
| 4,495,235 | 1/1985 | Tesch | 428/137 |
| 4,530,869 | 7/1985 | Tesch | 428/69 |
| 4,565,468 | 1/1986 | Crawford | 405/270 |
| 4,603,075 | 7/1986 | Dergarabedian et al. | 428/235 |
| 4,622,260 | 11/1986 | Tesch | 428/173 |
| 4,837,085 | 6/1989 | McGroarty | 421/451 |
| 4,849,273 | 7/1989 | Skinner et al. | 428/102 |
| 4,902,559 | 2/1990 | Eschwey | 428/283 |
| 5,041,330 | 8/1991 | Heerten | 428/283 |

FOREIGN PATENT DOCUMENTS

| 0071213 | 2/1983 | European Pat. Off. |
| 0278419 | 8/1988 | European Pat. Off. |
| 0379466 | 7/1990 | European Pat. Off. |
| 2151912A | 7/1985 | United Kingdom |
| 2202185B | 10/1990 | United Kingdom |

*Primary Examiner*—James C. Cannon
*Attorney, Agent, or Firm*—Marshall, O'Toole, Gerstein, Murray & Borun

[57] ABSTRACT

A method of manufacturing a water barrier fabric, in flexible or rigid form, and article manufactured thereby, formed by dispersing a water-absorbent material, in powdered or granular form, among a mass of fibers during the formation of a loose mat of said fibers, to homogeneously disperse the powdered or granular water-absorbent material above, below and on each side of the fibers forming the mat, and thereafter densifying and structurally consolidating the mat, to secure the fibers in position surrounding and entrapping the water-absorbent material, such as by sewing, quilting, needle punching or otherwise bonding the fibers into a consolidated, structurally secure fabric at least partially filled with the powdered or granular water-absorbent material.

45 Claims, 5 Drawing Sheets

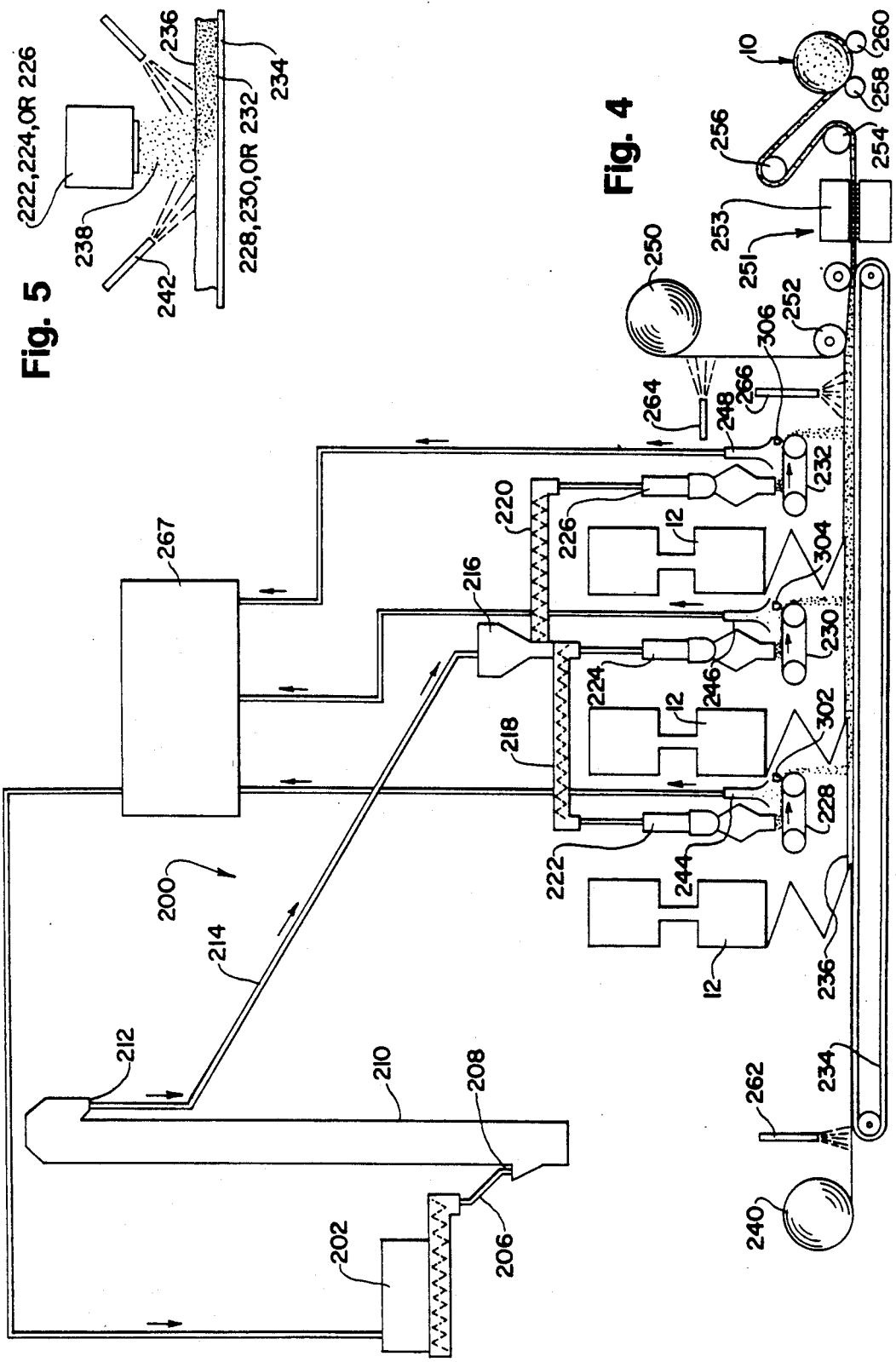

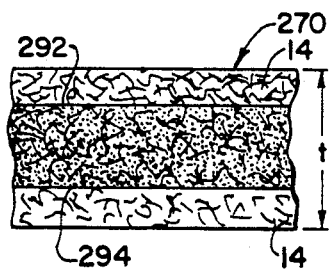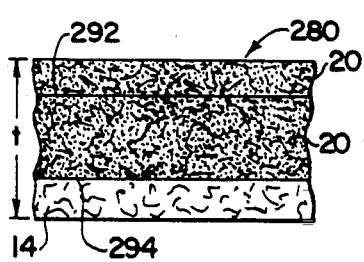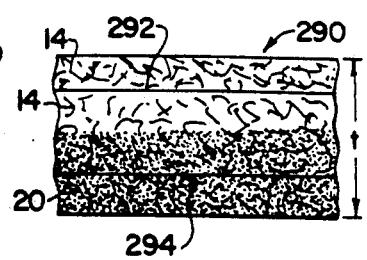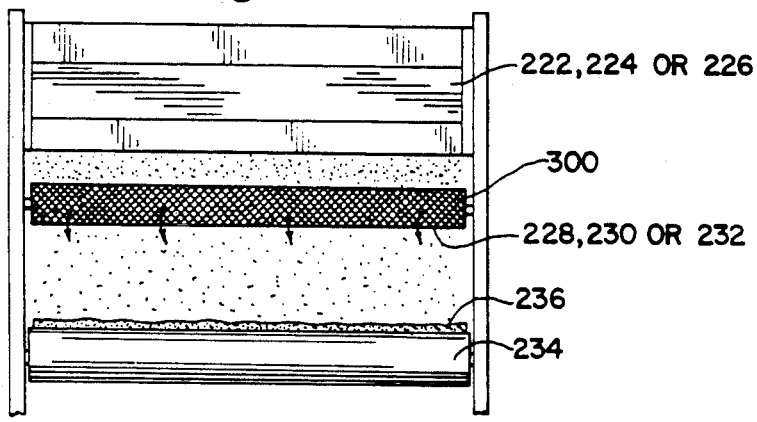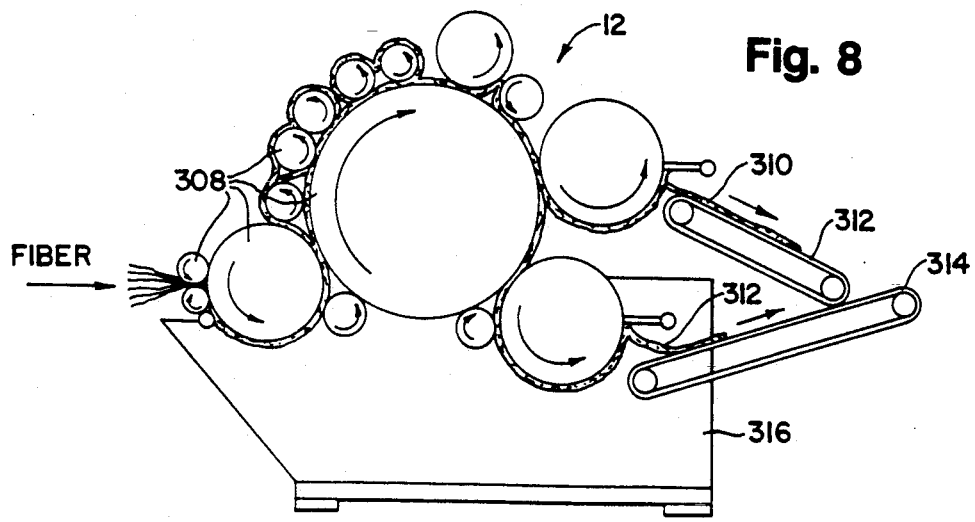

Fig. 9
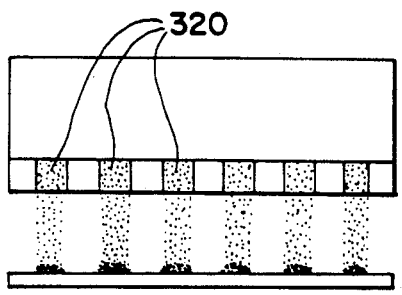
Fig. 10
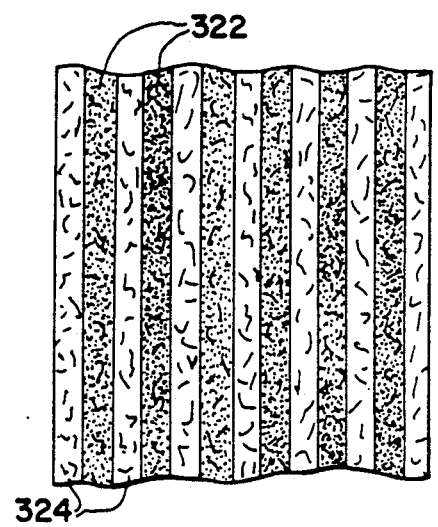
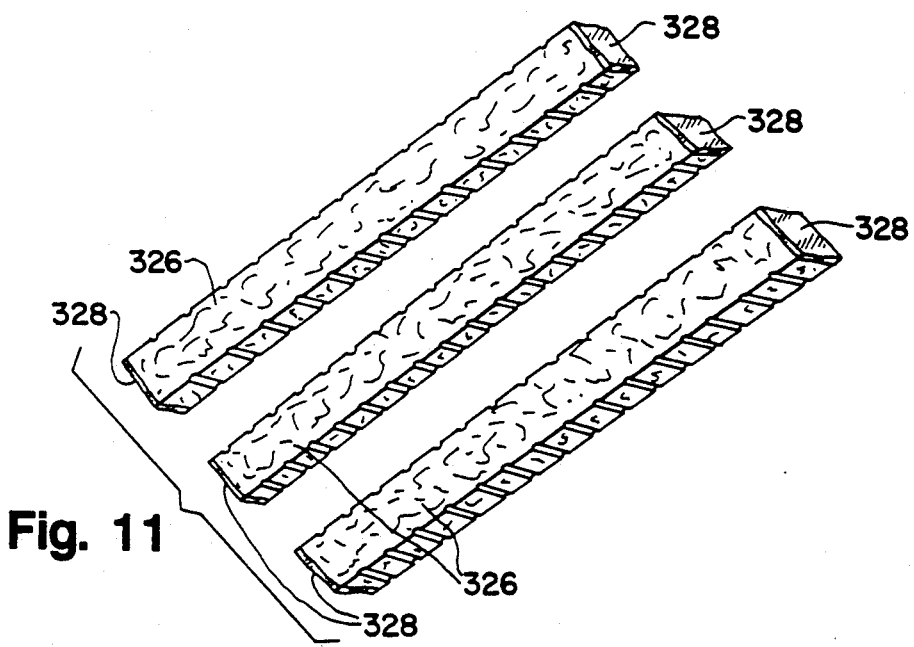
Fig. 11

WATER BARRIER FORMED FROM A CLAY-FIBER MAT

This is a continuation-in-part of copending application(s) Ser. No. 07/628,497 filed on Dec. 17, 1990, and now U.S. Pat. No. 5,174,231.

FIELD OF THE INVENTION

The present invention is directed to a method and article of manufacture useful as a waterproofing membrane for waterproofing surfaces such as soil, in the formation of waterproofed construction areas, soil structures, such as lagoons, hazardous or toxic waste containment areas, plaza decks, subterranean foundation surfaces and the like. The articles of the present invention also are useful as a Radon gas barrier, for example, to be applied as a layer beneath a floor of a building and for incorporation of any powdered or granular material between fibers of a flexible or rigid fabric. More particularly, the present invention is directed to a waterproofing article of manufacture formed by blending a water absorbent material, such as a smectite clay, e.g., bentonite clay, in powdered or granular form with fibers, as the fibers are laid down onto a support surface and formed into a non-woven mat. Alternatively, the powdered or granular material can be forced into the non-woven fabric, e.g., in aqueous paste form, after formation of the fabric.

BACKGROUND OF THE INVENTION AND PRIOR ART

Various polymers, swellable clays, and multi-layer articles of manufacture have been applied to the surface of soil to provide a waterproofing layer to prevent the penetration of water and hazardous or toxic materials into the earth, and to provide lagoons, ponds and other water-containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as bentonite, have been manufactured by adhesively securing the water-swellable clay to major interior surfaces of flexible sheet materials, e.g., Clem U.S. Pat. No. 4,501,788, for application to the soil surface in abutting or overlapping relation to adjoining multi-layered articles. Examples of other flexible sheet materials containing adhesively secured water-swellable clays are found in the following U.S. Pat. Nos.: Clem 4,467,015; McGroarty et al. 4,693,923; Harriett 4,656,062; and Harriett 4,787,780.

U.K. published Patent Application GB 2,202,185A discloses a layer of water-swellable bentonite between flexible fabric layers that have been needle punched together in a needle loom that secures the upper and lower layers together, wherein at least one of the fabric layers is a non-woven textile material.

Another waterproofing barrier, disclosed in Blais U.S. Pat. No. 4,344,722, is constructed in the field by applying a first flexible, water-permeable fabric layer, overlaying a thickness of water-swellable clay material and applying an overlay of the same flexible, water-permeable fabric thereover. Other patents disclosing the use of water-impermeable layers for protecting a soil surface include British Patent Specification 1,059,363; British Patent Specification 1,029,513 and British Patent Specification 1,129,840.

German Patent DE 37 04 503 C2 discloses an article having two fabric layers including one non-woven fabric, surrounding a bentonite clay layer wherein the two fabric layers are needle punched together. Crawford U.S. Pat. No. 4,565,468 discloses an article including two fabric layers surrounding a bentonite clay layer wherein the two fabric layers are quilted together in a pattern forming four sided compartments.

While the Blais waterproofing barrier does not require the use of adhesive because the multiple layers are assembled at their final location, this at-site assembly is disadvantageous because of the increased man hours necessary to construct the barrier at the site and because of the attendant difficulty in applying a uniform thickness of the water-swellable clay over the lower fabric layer with relatively crude construction equipment.

One of the problems associated with the manufacture of a water barrier constructed from upper and lower fabrics surrounding a layer of bentonite clay is that the intermediate clay layer can have only a limited thickness without the clay shifting or sliding during manufacture, shipping, handling and installation thereby causing the product to have different levels of water absorbent material at different points over the surface area of the product and surface area being protected from water penetration. Further, a portion of a clay layer that is too thick will fall out from the edges of the product, even if the surrounding fabrics are tightly needle punched or otherwise secured together.

Further, prior art needle punched products require relatively thick fabric layers above and below the water-absorbent material making it difficult to form a good seal at seams or areas of overlap since very little to no water-absorbent material will extrude through the upper or lower fabric surfaces for seam sealing. Further, the prior art "layered" products that include two fabric layers and an intermediate bentonite clay layer can separate during manufacture, shipping, handling and installation.

The articles of the present invention are manufactured such that the fiber contained in the article and the composite article is manufactured in a single layer, having fiber contained throughout the entire thickness of the article, and the article contains one or more powdered or granular materials, such as a water absorbent material, e.g., bentonite clay, distributed throughout any portion of the fiber, during or after manufacture. The powdered or granular, e.g., water-absorbent material is essentially immune from separation or substantial shifts and losses of water absorbent material since the material is relatively densely surrounded by fiber, having an amount of fiber, by weight, of at least 3%, preferably at least about 5% and up to about 50% by weight fiber throughout the thickness of the article.

The clay interlocking between fibers achieved in accordance with the present invention, wherein the clay is surrounded by a relatively dense volume of intertangled horizontal fibers, and optionally may be further interlocked by needling to also provide vertically disposed fibers tangled with generally horizontally oriented fibers, thereby more securely interlocking the clay in position, is new and unexpected in the flexible water barrier art. Surprisingly, sufficient clay can be incorporated between fibers such that the resulting article performs at least as well as the prior art products that include a central layer of relatively pure bentonite clay, and having only about 0.1% to possibly about 2% by weight vertically aligned fiber distributed through the clay as a result of needling.

The above disadvantages of prior art "layered" clay-containing water barrier articles are overcome in accordance with the principles of the present invention, as will be described in more detail hereinafter.

SUMMARY OF THE INVENTION

In brief, the present invention is directed to a method of manufacturing a powdered or granular material-filled, or partially-filled, fabric, e.g., a bentonite clay-filled water barrier fabric, in flexible or rigid form, and articles manufactured thereby, formed by incorporating a water-absorbent material, in powdered or granular form, into a mass of fibers, preferably during, or after the formation of a loose mat of said fibers, to blend the powdered or granular water-absorbent material above, below and on each side of the fibers forming the mat, and thereafter densifying and structurally consolidating the mat, to secure the fibers in position surrounding and entrapping or interlocking the powdered or granular, e.g., water-absorbent material, such as by sewing, quilting, needle punching or otherwise bonding the fibers into a consolidated, structurally secure fabric that is at least partially filled with the powdered or granular material. The resulting article, in its preferred form, includes a mat of fibers homogeneously distributed over at least a portion of its thickness with sufficient water-absorbent material to substantially impede the penetration of water through the article.

The method of manufacture permits the manufacture of an article that includes a water-absorbent material that is structurally secure and contains water-absorbent material intermingled with fiber, wherein the fiber is contained throughout the thickness of the article to provide either a flexible or a rigid fabric material, and permits the manufacture of various modified water barrier articles including articles that have concentrated areas of fiber, with little or no powdered or granular material, for the purpose of gas venting; articles that include both a water-absorbent material and a contaminant-treating material, such as a zeolite or an organophilic clay for treatment of contaminants in the water impeded from flow by the article; a minimum of leakage of water-absorbent and/or other powdered or granular materials held by the fibers; the application of layer(s) of water-impermeable or water-permeable sealing material(s) over one or both major surfaces of the article as a safety or secondary layer of water-impermeability or to better seal the surface granular or powdered material in place; the application of solid or liquid adhesive materials or compositions to one or both major surfaces and/or to any of the edges of the article for complete retention of essentially all powdered and/or granular materials dispersed between fibers during manufacture; the capability of inserting one or more rigidifying materials into or onto the article during manufacture, such as a sheet of fiberglass; rope; cardboard; relatively rigid corrugated materials, e.g., corrugated cardboard, and the like at some point at or between the top and bottom major surfaces of the article to provide various degrees of flexibility or rigidity; and the adaptability to structurally consolidate or secure the fibers together, surrounded by the powdered or granular material(s), in any number of ways, such as needle punching, sewing, quilting, saturation bonding, melting the fibers together in a densified or compressed state, adhesively bonding the fibers together, and/or chemically bonding the fibers together; and providing various sizes and shapes and denier of fibers either alone or in admixture with other fibers to achieve the benefits of each.

In one embodiment, after combining a powdered or granular material, such as a water absorbent material with the loosely formed fibers, the article is consolidated to give the mat sufficient structural integrity for shipping, handling, and installation without significant loss of water-absorbent or other powdered or granular material. The powdered or granular water-absorbent material, e.g., water-swellable clay, such a bentonite, is surrounded by contacting fibers to form a powdered or granular material-filled, e.g., water-absorbent material-filled flexible fabric material, such as a geotextile fabric, wherein the powdered or granular material, e.g., bentonite clay, is incorporated into at least a portion of the thickness of the article within adjacent planes that define a rectangular depth of fibers by virtue of being applied to the fibers during or after the manufacture of the fabric. The fiber-clay mat is structurally consolidated, such as by sewing or needle punching the mat from one or both surfaces at spaced locations, preferably, when needled, after lubrication of the powdered or granular material to provide a structurally sound fabric material preferably having a water-swellable clay homogeneously dispersed throughout the entire thickness, or over only a portion of the thickness of the article.

The method of manufacture allows great flexibility to form flexible fabrics uniformly filled with various materials at various adjacent or spaced planes, of any desired thickness, along the thickness of the finished fabric and for varying the quantity and location of the water-absorbent material securely incorporated between the fibers of the article. Further, by adding the water-absorbent material before consolidation of the mat, the water-absorbent material is more tenaciously held between adjacent fibers and, therefore, is less likely to be lost from the finished fabric during storage, shipping or installation.

The water-absorbent material can be withheld from a portion of the mat, if desired, to provide for gas venting or to provide a space or area for the clay to expand, or to provide areas for the addition of other powdered or granular materials, such as an organophilic clay, a zeolite or other contaminant-treating material, as disclosed in this assignee's prior application Ser. No. 07/392,775, filed Aug. 11, 1989, and now U.S. Pat. No. 5,043,076, hereby incorporated by reference. For example, sufficient fabric porosity can be provided by omitting the clay addition throughout a predetermined thickness at the top major surface, bottom major surface or along an intermediate three dimensional thickness of the finished article to permit lateral gas venting through the unfilled portion or concentrated fiber area of the article. Alternatively, the powdered or granular, e.g., water-absorbent, material can be concentrated near the top or bottom surface fibers in one or both major surfaces to permit the water-swellable clay layer to extrude from the interior of the article to a planar surface immediately above and/or below one or both exterior surfaces of the article, thereby creating a sealing layer of water-swellable clay capable of sealing at overlaps and seams between adjacent or overlapping articles.

The article of manufacture of the present invention can maintain a relatively heavy, uniform distribution of water-swellable clay dispersed among the fibers without the necessity of application of adhesive on the fibers, or the clay can be adhered to the fibers during manufacture with a suitable adhesive. Where desirable, water or an adhesive can be applied to the powdered or granular materials or to the fibers to prevent the water-swellable clay and other powdered or granular additives from falling out of the article, or to better position the clay within any desired, predetermined portion of the article; and/or the fibers may be needle punched or sewn together. In other embodiments, water-impermeable layers can be adhered to one or both major exterior surfaces of the article, or placed between adjacent articles or at an overlap of adjacent articles during installation to provide additional or safety layers of impermeability.

In accordance with one important and optional feature of one embodiment of the present invention, when the fibers are consolidated (structurally secured together to define a final thickness) by needle punching, sewing or quilting, a bentonite clay/needle interface is lubricated, at least in the areas where the clay is penetrated by a needle during entanglement of vertically displaced fibers with horizontally oriented fibers, such as by wetting the fibers with a lubricant, liquid or dry, preferably water or other aqueous lubricant, e.g., aqueous solutions containing a lubricant, such as a glycol, to provide easier needle penetration (less friction) with less wear and/or needle breakage; and quicker and more efficient manufacture. Alternatively, either particulate or granular material, or the fibers, can be wetted on their surface before, during or after incorporation of the powdered or granular particles between the fibers. Alternatively, only a portion of the clay or other powdered or granular material or fibers are wetted in an amount sufficient to lessen the friction of the needles during penetration of the clay.

In accordance with another important embodiment of the present invention, the fibers, at least a portion of which are surrounded by the particulate or granular material, are interconnected by needle punching wherein a plurality of horizontally oriented fibers or filaments or strands of material are displaced from a generally horizontal orientation and forced in a generally vertical orientation by a plurality of needles that are punched vertically into one or both major surfaces of the article through at least a portion of the thickness of the article, during manufacture, while the article is in mat form compressed to approximate its final thickness, to structurally secure the fibers together, surrounded by the particulate or granular material. The fibers, filaments or strands of material can be consolidated in a number of ways to permanently interconnect the fibers in a compressed, relatively dense form surrounding the powdered or granular material, such as by needle punching, melting, adhesively, or otherwise securing adjacent fibers together to consolidate the fibers into a single fabric layer, of any desired thickness, wherein the fibers surround the powdered or granular, e.g., water-absorbent, material in an amount sufficient to substantially impede the flow of water through the article, or as a Radon gas barrier, as a contaminant-treating article, or having any combination of these functions.

In the case of fabric consolidation using needles, e.g., needle punching, sewing or quilting, it is preferred that the powdered or granular material, and/or the surrounding fibers, are first wetted, at least at a needle-penetrated surface of the clay or other powdered or granular material at least in an area of the mat wherein the powdered or granular material is in contact with the sewing or needle punch needles, to reduce the coefficient of friction of the powdered or granular material prior to needle penetration, thereby reducing needle breakage and vibration of the article during manufacture. Lubrication substantially reduces the movement of the powdered or granular material during manufacture, thereby aiding to maintain a consistent, homogeneous loading of powdered or granular material per unit of surface area throughout a desired portion of the article, or throughout the fibers of the article, through completion of manufacture. This lubrication of either the powdered or granular material, or the fibers, is effective to reduce needle wear and breakage whether the product is manufactured with two separate fabrics surrounding a separate layer of powdered or granular abrasive material, or if the product is manufactured to include the powdered or granular material surrounding the fibers, as described herein.

Accordingly, one aspect of the present invention is to provide a new and improved article of manufacture and method of making the article by incorporating a powdered or granular, e.g., water-absorbent, material into a mat of generally horizontally disposed fibers during or after fabric manufacture and, when incorporated during manufacture, thereafter consolidating the fibrous mat to tenaciously hold the powdered or granular material in place, surrounding predominantly generally horizontally oriented fibers of the consolidated fabric, while providing structural integrity to the mat.

Another aspect of the present invention is to provide a method of consolidating fibers within a loose mat, surrounded by a powdered or granular material, by needle punching, sewing, quilting, gluing, heat melting, saturation bonding, chemical bonding, or the like.

Another aspect of the present invention is to provide a new and improved article of manufacture including a water-swellable clay material incorporated throughout the fibers of a flexible fabric material where the fibers may be a blend of synthetic and/or natural fibers of differing length, thickness, composition and/or physical or chemical properties.

Still another aspect of the present invention is to provide a new and improved waterproofing membrane capable of holding water disposed above the membrane such that water permeates the membrane at a rate of $1 \times 10^{-7}$ cm/sec or less, wherein the membrane is formed from a mat of fibers having a powdered or granular water-absorbent material surrounding at least a portion of the fibers and the mat then is consolidated to densify the mat and structurally secure the fibers together while interlocking the water-absorbent material in place surrounding the fibers such that the membrane can maintain a homogeneous, even distribution of clay, or, if desired, the powdered or granular material can be concentrated throughout any desired portion of the article.

A further aspect of the present invention is to provide a new and improved article of manufacture including a flexible fibrous sheet material having a concentration of fibers in one or more areas of the product, and having a powdered or granular material, e.g., a water-absorbent material, such as a water-swellable clay, cencentrated in one or more other portions of the product, and optionally including a powdered or granular active liquid-interacting material, wherein the active material is selected from the group consisting of a water-swellable clay, an organophilic clay, a zeolite, a water-soluble contaminant-absorbent, a water-soluble contaminant adsorbent, an ion-exchange material, a water-soluble contaminant reactant, a water-soluble contaminant neutralizing material, and mixtures thereof as separately applied or intermixed materials by applying the powdered or granular materials as an admixture or applying them sequentially surrounding the fibers of a loose mat of fibrous material during the manufacture of a fabric.

The above and other aspects and advantages of the present invention will become apparent from the following detailed description of the preferred embodiments of the present invention taken in conjunction with the drawings.

BRIEF DESCRIPTION OF THE DRAWINGS

FIG. 4 is a schematic view of dry feeding system for particulate or granular materials, such as bentonite clay, in an alternate method and apparatus of the present invention;

FIG. 5 is a partially broken-away side view of one of the optional lubrication nozzles for lubrication of powdered or granular material prior to needling;

FIGS. 6a, 6b and 6c are enlarged, broken-away side views of articles manufactured in accordance with the present invention that include intermediate sheets or nets of strengthening materials and include a powdered or granular material in only a portion of the thickness of the article;

FIG. 7 is a partially broken-away front view of the fiber and powdered or granular material blending portion of the method and apparatus shown in FIG. 4;

FIG. 8 is a schematic diagram of a typical webbing device used to deposit fibers into a loose mat, of any desired thickness, of generally horizontally oriented, fluffed fibers capable of receiving a powdered or granular material;

FIG. 9 is a front view of another embodiment of a feeding device for powdered or granular material for depositing the powdered or granular material in parallel, elongated, and spaced strips;

FIG. 10 is a top view of an article produced using the feeding device of FIG. 9; and FIG. 11 is a perspective view of tubular articles cut from the article of FIG. 10 and sealed on their ends.

DETAILED DESCRIPTION OF THE PREFERRED EMBODIMENTS

Figure 1:
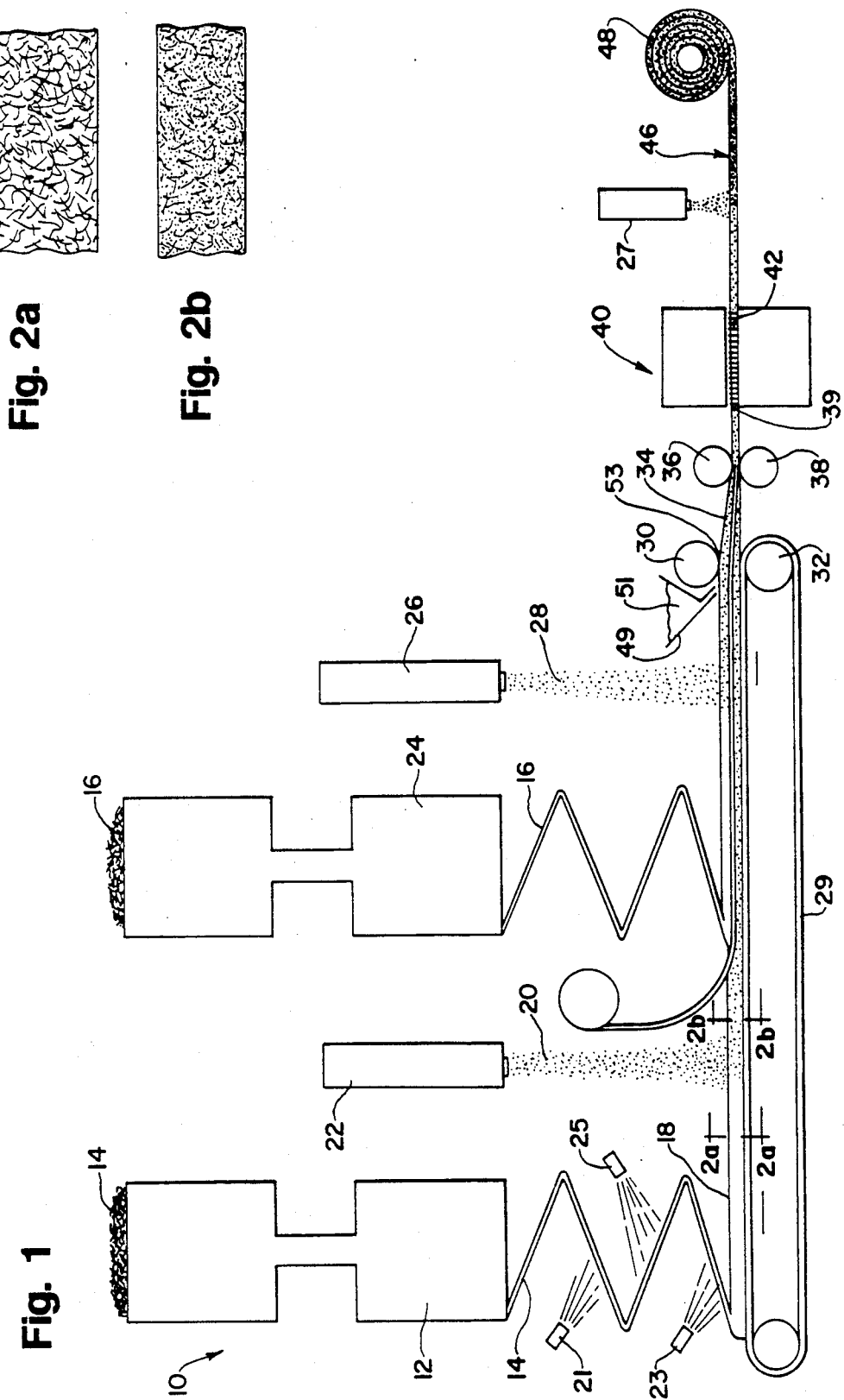
FIG. 1 is a partially broken-away, schematic view of the method of manufacture and apparatus of the present invention.

Turning now to the drawings, and initially to FIG. 1, there is illustrated a method and apparatus for manufacturing a powdered or granular material-containing article, e.g., a bentonite clay-filled water barrier, comprising a mass of intertangled fibers surrounded by particles or granules of a water-absorbent material, such as bentonite clay, that is held in place within the article by the surrounding fibers. The apparatus, generally designated by reference numeral 10, includes a fiber webbing device, generally designated by reference numeral 12, that deposits fibers 14, e.g., natural and/or synthetic raw virgin fiber, reprocessed natural and/or synthetic fiber, or blends of raw virgin natural and/or synthetic fiber with reprocessed or recycled natural and/or synthetic fibers, by gravity onto a support surface, such as conveyor belt 16, in the form of a very loose, non-compacted, fluffy fibrous mat 18 of generally horizontally oriented intertangled fibers 14. The mat 18 has sufficient porosity between fibers 14 to receive a powdered or granular material, e.g., a water-absorbent material, such as bentonite clay 20.

As shown in FIG. 1, after or during the deposition of a suitable thickness, e.g., about 0.5 to about 25 inches, of fiber(s) 14 in the form of a loose fibrous mat 18, having a density in the range of, for example, about 0.1 ounce to about 50 ounces of fiber per square foot, preferably about 1 ounce to about 10 ounces of fiber per square foot, the powdered or granular material 20, such as bentonite clay, is deposited on the surface of fibers 14 forming the mat 18. The powdered or granular material 20 has a sufficiently small size, about 0.02 millimeters to about 15 millimeters in diameter, e.g., between about 1 and about 400 mesh, that the material, e.g., bentonite clay 20, penetrates into the void spaces between fibers 14 forming the mat 18 to substantially fill the void spaces between fibers 14 within the mat 18. A preferred size for the powdered or granular material 20 is in the range of about 10 mesh to about 50 mesh U.S. seive, e.g., about 0.3 millimeters to about 2.0 millimeters particle size. The bentonite clay or other powdered or granular material 20 is deposited by gravity from a suitable powdered or granular material holding vessel 22 disposed downstream from the fiber feeding device 12 such that, in a preferred embodiment, the bentonite clay 20 infiltrates the mat 18 and is homogeneously distributed to surround substantially all fibers 14 in the interior of the mat 18 over substantially the entire thickness and width of the mat 18. To assure complete filling of powdered or granular material for more densely compacted fibers and for the larger size powdered or granular materials, optional water nozzle(s) 21, 23 and/or 25 can be disposed to spray the fibers 14 during deposition from each webbing device 12 and 24 for better adherence of the powdered or granular material(s) 20 and/or 28 to the fibers 14 and/or 16. The intertangled, generally horizontally oriented fiber(s) in each web 14, 16, have a preferred individual fiber length of about 0.1 to about 25 inches, more preferably about 1 to about 5 inches in length, and a denier of about 1 to about 5000, more preferably about 4 to about 500 denier, and most preferably about 60 to about 200 denier.

Alternatively, the fabric can be completely consolidated such as by needle punching, prior to the addition of the powdered or granular material, such as from powdered or granular material feeding devĩce 27 (FIG. 1) if the fibers have a sufficiently large thickness, e.g., about 80 to about 200 denier.

Optionally, one or more additional fiber webbing devices 24 and one or more additional powdered or granular material holding vessels 26 can be provided for further deposition of the same or different fiber material 16 and the same or different powdered or granular material 28, in dry and/or water slurry form, to achieve a thicker mat of material and/or to provide an article that contains fibers of different properties and/or contains different powdered or granular materials having different properties or characteristics, such as the capability of treating water contaminants and the like, as will be described in more detail hereinafter.

Figure 3:
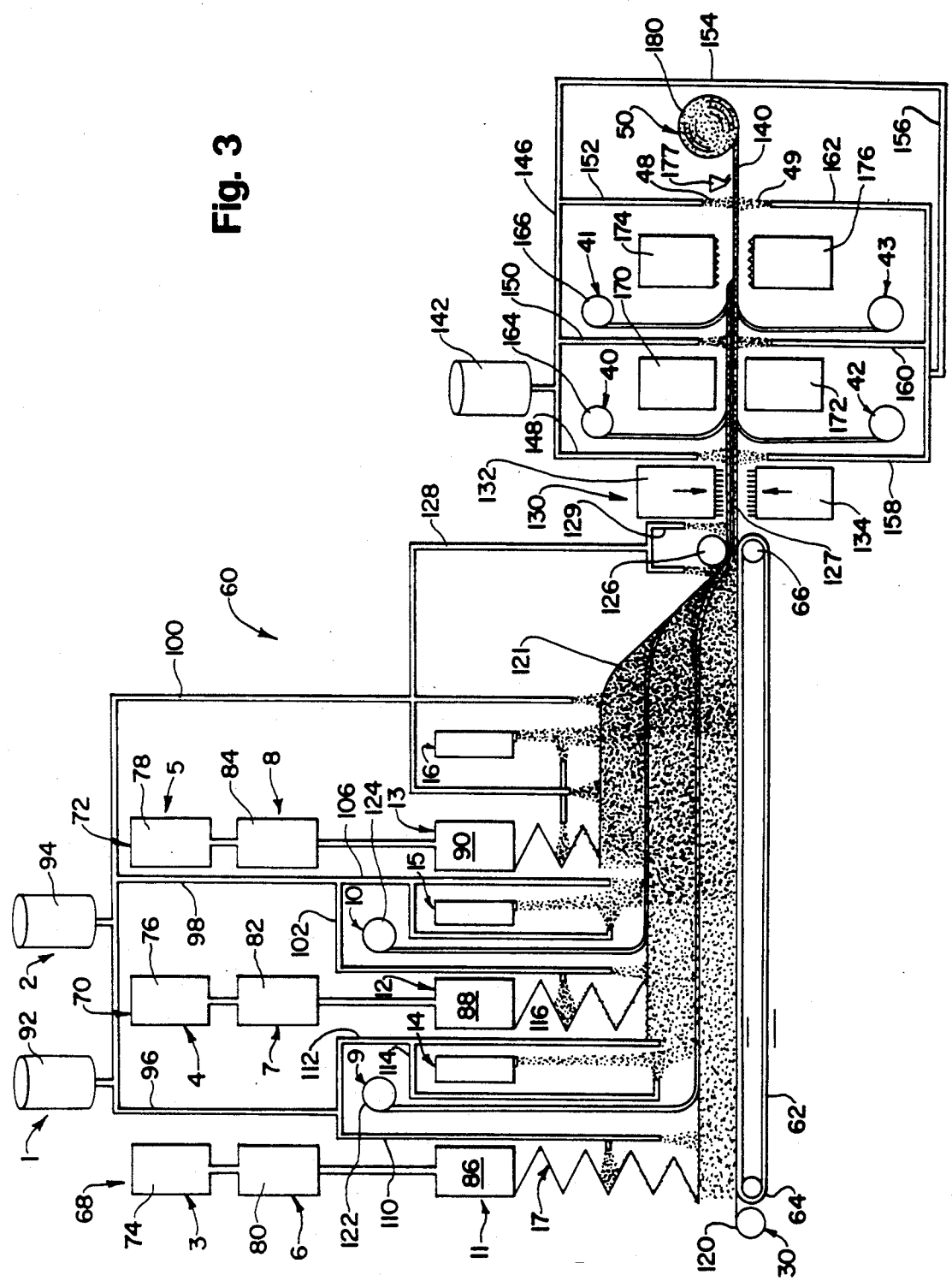
FIG. 3 is a partially broken-away, schematic flow diagram of the manufacturing process and apparatus of the present invention, similar to FIG. 1, showing various optional features.

As shown in FIGS. 1, 3 and 4, the fiber webbing devices, e.g., 12 and 24, preferably distribute the fibers 14 and 16 as loosely deposited webs of generally horizontally oriented fibers, wherein the webs are deposited in a reticulated manner, folding later deposited loose webs of fibers onto earlier deposited loose webs of fibers such that the fibers are laid down by gravity on top of the conveyor belt 16 and upon themselves in a very loose, very porous, fluffed mat. Although the drawings emphasize the position of each web as initially deposited, illustrating demarcation between each web, it should be understood that any layering of the fibers from the webbing devices, e.g., 12 and 24, is visually nondetectable after deposition of fibers 14 and 16 from the fiber webbing devices, e.g., 12 and 24, so that the fibrous mat 39 is a single layer of fibers.

After incorporation of the powdered or granular material, such as bentonite clay 20 and/or another powdered or granular material 28, the filled mat of fibers containing the powdered or granular material within any desired thickness of the article 10 passes through a pair of pressure nip rollers 30 and 32 to partially densify the mat into a partially consolidated, e.g., water-barrier, structure 34. The partially consolidated article 34 thereafter passes through a second pair of nip rollers 36 and 38 to further consolidate the mat into an article 39 having a smaller thickness and increased structural integrity. Optionally, the consolidated mat 39 containing powdered or granular material, such as bentonite clay 20 and/or another material 28, can be passed through a sewing, quilting, or needle punch station, generally designated by reference numeral 40 where, for example, a plurality of spaced needles 42 can penetrate the mat to dislodge generally horizontally oriented fibers vertically, upwardly and/or downwardly, from their position as initially laid down so that the fibers are substantially more intertangled, having both horizontal and vertical fibers tangled together. Such needle punching is accomplished after compression of the mat 39 between pressure nip rollers 30 and 32, thereby tightly securing the fibers together surrounded by the powdered or granular material 20 and/or 28 to form a structurally stable water barrier 46. The article 46 then can be rolled around a suitable mandrel into a roll of material 48. Needle punching is well known in the art as a common method for initially manufacturing non-woven fabrics.

In an alternate method of manufacture, as shown in FIG. 1, a material hopper 49, containing a bentonite clay-water paste 51, e.g., about 1% to about 80% clay, be weight, in water, preferably about 30% by weight clay, can be applied as a layer 53 of the bentonite paste onto a major surface of the mat 18, and the layer 53 of bentonite paste is compressed into the mat 18 by pressure nip rollers 30 and 36. The bentonite paste layer should have a thickness approximating the final thickness of the article 46, or can be pressure forced into the mat over only a surface portion of the mat 18, by applying a thinner bentonite paste layer 53 of bentonite past 51 onto the surface of the mat 18. It is preferred that the bentonite paste layer is applied to the mat 18 prior to consolidation, as shown in FIG. 1, but, alternatively, the paste layer 53 can be applied to the partially compressed mat 34, in front of pressure nip rollers 36 and 38, or after the needle punching device 40, by adding pressure nip rollers immediately following the bentonite paste layer 53.

Figure 2A:
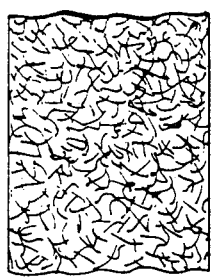
FIG. 2a is an enlarged, partially broken-away side view of a flexible mat formed with a concentrated area of powdered or granular filling material.
Figure 2B:
FIG. 2b is an enlarged, partially broken-away side view of the flexible mat of FIG. 1a that has been filled with a powdered or granular material, such as bentonite clay, over the entire thickness of the mat, useful as a water barrier.

FIG. 2a shows the loose mat 18 of fibers 14 prior to incorporation of the powdered or granular material surrounding the fibers 14, and prior to consolidating the mat 18 into a structurally secure article. FIG. 2b shows the partially consolidated article 39 containing a powdered or granular material 20 between fibers 14.

Turning now to FIG. 3, there is shown a schematic diagram for manufacturing the water-barrier articles of the present invention, including many optional features any one or more of which can be included in the manufacturing process to provide various characteristics and properties to the articles of the present invention.

In accordance with the embodiments shown in FIG. 3, the water-barrier article can be manufactured to include a layer of woven, non-woven or water-impermeable sheet material on one or both major exterior surfaces; one or both major surfaces can be coated with a sealing layer of a liquid sealant, such as an aqueous adhesive or solvent-based adhesive, e.g., Mobil-Kote.® 435, a hot-melt water-sealant wax coating applied by curtain coating, spraying, or other known coating means, where the carrier, (water or other solvent) is evaporated leaving a sealant film that is either water-permeable or water-impermeable; various reinforcing materials can be included within the interior and/or exterior of the article to provide structural reinforcement or to provide various degrees of article rigidity; portions of the article along its thickness can be manufactured to include different fibers or the same fibers having different sizes, lengths, thicknesses and densities to achieve the properties and characteristics of the various fibers; portions of the article along its thickness can be left with low concentrations of or without a powdered or granular material so that a portion of the article is very porous to allow for venting of gases captured by the article from below; and powdered or granular materials such as bentonite clay can be intermixed with the fibers being deposited from the fiber deposition devices during the fall by gravity of the fibers onto the support surface. Any of these features can be used alone or together with any of the other features, as shown in FIG. 3, to provide very unique water-barrier articles having any number of different properties and the capability of treating contaminants and the like.

As shown in FIG. 3, there is illustrated a method and apparatus, generally designated by reference numeral 60, similar to the apparatus shown in FIG. 1 and including a number of optional features each of which can be used alone or in combination with any of the other features for manufacturing a product having a single or plurality of different granular or powdered materials, a combination of different types or sizes of fiber, and with or without various reinforcing materials and/or coating materials added to the interior or to one or both exterior surfaces of the article being manufactured to provide various characteristics or properties to the finished article, as will be described in more detail hereinafter. The apparatus 60 generally includes a conveyor belt 62 that travels continuously around a pair of rollers 64 and 66, at least one of which is motor driven at a desired speed; three fiber feeding devices, generally designated by reference numerals 68, 70 and 72, each of which includes a fiber feeder 74, 76 or 78, respectively, and a webbing device 80, 82 or 84, respectively, that feeds the fiber to a cross-lapper 86, 88 or 90, respectively; a pair of water-absorbent material slurry tanks 92 and 94 adapted to feed a water slurry of water-absorbent material through feed conduits 96, 98, 100, 102, 104, 106, 108, 110, 112, 114 and 116 to a plurality of different locations for admixture with fiber at various levels of the mat 121 during the deposition of fibers, at various heights of fiber, onto either the conveyor belt 62 or onto an optional web, netting or sheet material 120, such as an axially oriented netting, jute, woven geotextile or other woven fabric, non-woven geotextile or other non-woven fabric, paper or other textile materials, water-impermeable sheet materials, such as polyethylene or polypropylene, and the like. A water-impermeable sheet material layer used as a secondary water barrier layer, e.g., 40, 41, 42 and/or 43, should be applied to the surface(s) of the article after (downstream from) the needling device so that the surface sheet material will not be punctured by needling.

As described with reference to FIG. 1, one, two or all three of the fiber-feeding devices 68, 70 and/or 72 are used to deposit a loose mat of fiber onto either the upper surface of the conveyor belt 62 or the lower layer of web, netting or sheet material 120. The water-absorbent material slurry tanks 92 and/or 94 deliver a water slurry of powdered or granular water-absorbent material to surround the fibers as they are deposited to incorporate a water-absorbent powdered or granular material over a desired thickness of the fiber material during fiber deposition to form the loose mat 121.

When applied from a water slurry, the powdered or granular material will accumulate more readily where the powdered or granular material contacts the fibers and has less of a tendency to downwardly infiltrate into the mat by gravity. Accordingly, a combination of dry powdered or granular material and a water slurry of powdered or granular material can be used to incorporate the material wherever desired throughout the article.

The loose fibrous mat 121 and incorporated powdered or granular water-absorbent material, with or without one or more intermediate materials, such as a reinforcing or water barrier web, netting, or sheet material from rolls 120, 122 and/or 124 are compressed between conveyor roller 66 and upper nip roller 126 to form a denser more consolidated article 127 emerging from the nip roller 66. Additional water-absorbent material in granular or powdered form can be applied to the partially consolidated article 127, just prior to or just after the nip roller 126, from clay feeding conduits 130 and 132 to provide one or more surface concentrations of water-absorbent or different powdered or granular material. The partially consolidated mat 127 of fiber 17 and water-absorbent material emerging from between the nip rollers 66 and 126 then is completely consolidated into a unitary structure of fiber and water-absorbent material, optionally containing one or more additional material, within the interior of the product or on one or both surfaces of the product, e.g., liquid adhesive, or a sheet material web, netting or sheet material from rolls 120, 122, and/or 124. The article is completely consolidated in any manner, for example, a needle loom, generally designated by reference numeral 130, including an upper loom section 132 and a lower loom section 134, at least one of the loom sections 132 or 134 including barbed or notched needles extending perpendicularly towards the partially consolidated fibrous water-absorbent article 127 for dislodging the generally horizontally oriented fibers vertically, and intermingling the fibers while densifying the article between the upper loom section 132 and lower loom section 134 to completely consolidate the mat into a unitary structure 140.

After consolidation in the needle loom 130, or in any other manner, additional water-absorbent material can be deposited onto upper and/or lower surfaces of the consolidated article 140 via clay slurry conduit 129, and/or surface treating dry powdered or granular material holding tank 142 and conduits 146, 148, 150, 152, 154, 156, 158, 160 and/or 162 to supply additional water-absorbent material or other coating materials onto the upper and/or lower major surfaces of the consolidated mat 140 or for application of additional water-absorbent material beneath or on top of other materials, e.g., a roll material, such as woven and/or non-woven fabric materials or water-impermeable sheet material or strengthening netting, and the like supplied from material rolls 164 and/or 166. Upper and/or lower heating devices 170 and 172 can be provided above and below the consolidated mat 140 for curing any coating and/or adhesive that is supplied to the upper and/or lower major surfaces of the consolidated mat 140 to cure and/or dry any coating, lubricant or adhesive material that is applied to the surfaces of the article 140 from the holding tank 142. Additionally, slicing or searing devices 174 and/or 176 can be provided above and/or below the article for improving the clay extrudability from the article. The slicing or searing devices 174 and/or 176 can be used to slice and/or sear the article on one or both major surfaces, at any point during the manufacture of the article 140, for improved extrusion of clay to provide seam and/or overlap sealing of adjacent articles, or can be bypassed. When the slicing or searing devices 174 and/or 176 are used before deposition of powdered or granular material, e.g., 48 in FIG. 4, it is preferred to contact the sliced or seared surface of the article with a brush or scrapper 177 to force the powdered or granular material 48 into the surface cuts or slices. The finished article can be collected in a roll form 180 taken up on a suitable mandrel 182 or can be festooned onto pallets (not shown) or the like.

As shown in FIG. 3, the article of manufacture can be secured on its outer surfaces to a lower layer of sheet material 120, 42 or 43 and/or an upper layer 40 or 41 of another water barrier material, such as a polyolefin, e.g., polyethylene or polypropylene, from very low density (e.g., 0.80 specific gravity) to high density (e.g., 0.97 specific gravity) textured and/or smooth, or a geotextile, from very low density to high density, e.g., having a specific gravity between about 0.80 and about 0.97, or a polybutene or polypropene composition as disclosed in this assignee's U.S. Pat. Nos. 4,534,925; 4,534,926 and 4,668,724, hereby incorporated by reference, can be secured to one or both major surfaces of the article. The composite article comprising a fully or partially filled fibrous mat, as described with reference to FIGS. 1, 2 and 3, adhered to the polypropene or polybutene compositions of U.S. Pat. Nos. 4,534,925; 4,534,926 or 4,668,724 is particularly suitable for securing to a plaza deck, or other, e.g., concrete, planar surfaces, and provides new and unexpected waterproofing.

In accordance with one important embodiment of the present invention, it has been found that the powdered or granular material-filled fibers can be needle-punched, sewn or otherwise secured together to interlock the powdered or granular material between fibers much more effectively, efficiently and maintaining a desired, relatively high loading of powdered or granular material while experiencing substantially less needle wear and breakage by wetting the powdered or granular material or wetting the surrounding fibers prior to needle penetration. In accordance with a preferred embodiment, the fibers are secured together structurally with threads, fibers, filaments or strands of fiber material that has been needle punched to interlock the fibers together at spaced intervals (e.g., 2 to 500 mil spacing, preferably about 2 to about 20 mil spacing) by applying water or other lubricating liquid to the surface of the powdered or granular material, or to the fibers, either after the material is deposited onto the fibers, or during deposition of the powdered or granular material, and thereby avoiding substantial needle wear and breakage with the fibers intertangled together and surrounding a more uniform loading of powdered or granular material as a result of less vibration experienced by the article during manufacture.

Turning now to FIG. 4, there is shown a schematic diagram of one method of loading a loose mat with powdered or granular material, such as bentonite clay, in a dry state. The dry material feeding apparatus, generally designated by reference numeral 200 is useful for depositing one or more powdered or granular materials, such as a water-swellable clay, e.g., bentonite, from a clay receiving hopper 202. An auger 204, disposed at a lower end of the receiving hopper 202 and in fluid communication therewith, forces the water-swellable clay through conduit 206 to an inlet 208 of a clay elevator 210. The water-swellable clay is discharged from the clay elevator 210 at clay elevator outlet opening 212, through conduit 214 into a clay-receiving hopper 216. A pair of augers 218 and 220 in fluid communication with a lower portion of hopper 216 force the clay into one, two or three clay feeding mechanisms, generally designated by reference numerals 222, 224 and 226, for feeding the clay in a controlled manner to one, two or three continuous clay feed conveyor belts 228, 230 and 232 successively aligned above an elongated product conveyor belt 234. The clay generally is applied over the mat of fibers that is initially formed into a loose mat 236 deposited from one or more fiber feeding devices, generally designated 12, described with reference to FIGS. 1 and 3. The water-absorbent clay 238 and/or other powdered or granular material, is deposited for admixture with the fibers in mat 236 and substantially fills the void spaces between fibers in mat 236 in an amount of about ¼ to about 30 pounds of powdered or granular material per square foot of finished article preferably about ¼ to about 5 pounds of powdered or granular material per square foot of article surface area.

In accordance with one embodiment of the present invention, FIG. 4, an optional supply of a flexible sheet material in roll form 240 is disposed above the continuous product conveyor belt 234 to provide a continuous supply of flexible sheet material onto an upper surface of the product conveyor belt 234. The sheet material from roll 240 receives a loose mat of fiber that is at least partially filled with the powdered or granular material, e.g., clay 238 from one or more of the dry clay feeding mechanisms 222, 224 and/or 226, deposited onto the fibers from one, two or all three of the clay feed conveyor belts 228, 230 and 232. Any one, two or all three of the water-swellable clay feed conveyor belts 228, 230 and 232 can be used to incorporate the same or different powdered or granular materials throughout a portion of, or the entire thickness of the loose mat of fibers deposited from one or more of the fiber feeding devices 12.

As shown in FIG. 5, the individual powdered or granular materials, e.g., clay particles 238, can be deposited dry (less than bout 15% by weight water) and then wetted during deposition of the particles 238 onto the loose mat 236 by spraying the particles 238, via spray nozzles 242, across the entire width of the mat 236, as the particles drop from the clay feeders 222, 224 and/or 226. In this manner, the entire thickness or any portion of the thickness of the fibrous mat 236 can be filled with the water-absorbent material, e.g., clay 238, and the clay particles can be wetted for lubrication prior to, during, or after deposition between the fibers of loose mat 236. Dust collection suction devices 244, 246 and 248 are disposed near each continuous clay feed conveyor belt 228, 230 and 232 to clear the air of fine clay particles emanating from clay feeding mechanisms 222, 224 and 226 and return the clay particles back to the dust collector 267 for disposal and/or back to the clay elevator 210. A second roll of flexible sheet material 250 optionally is disposed on a downstream side of the clay feeding mechanisms 222, 224, and 226 and above the product conveyor belt 234. The second roll of flexible sheet material 250 is fed by power driven roller 252, power rollers 254 and 256 and wind up rollers 258 and 260 to dispose flexible sheet material 250 on top of the fiber-clay article to dispose the fiber-clay material between lower flexible sheet material 240 and upper flexible sheet material 250. Optionally, the second roll 250 of sheet material can be disposed on a downstream side of needling device 251, if the needling device 251 includes vertically disposed barbed or notched needles extending downwardly from an upper needle loom section 253.

As shown in FIG. 4, additional or alternative water spray nozzles 262 and 264 can be positioned to wet an interior major surface of the sheet material 240 and/or 250, and spray nozzles, e.g., 266 can be positioned to wet the fibers in loose mat 236 and/or to wet the deposited clay particles and/or fibers at any point along the length of the conveyor belt 234.

The water-swellable clay utilized in filling void spaces between at least some of the fibers of the articles of the present invention is any water-swellable clay which will hydrate in the presence of water, i.e., will swell in the presence of water. In accordance with one important embodiment of the present invention, the clay is bentonite. A preferable bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillonite predominant in calcium ions can be converted to a high swelling sodium variety through a well known process called "peptizing". The clay utilized in this invention may be one or more peptized bentonites. The clay may also be any member of the dioctahedral or trioctahedral smectite group or mixtures thereof. Examples are Beidellite, Nontronite, Hectorite and Saponite. To achieve the full advantage of the present invention, the water-swellable clay, i.e., bentonite, generally is finely divided as known for use in water barrier panels and the like, i.e., about 1 to about 400 mesh, preferably about 10 to about 50 mesh.

As shown in FIGS. 6a, 6b and 6c, the articles of manufacture generally designated by reference numerals 270, 280 and 290, respectively, are manufactured to include a powdered or granular material, such as bentonite clay 20, incorporated to surround fibers 14, throughout only a portion of the overall thickness "t" of each article 270, 280 and 290. Each article 270, 280 and 290 is shown to include an upper sheet or netting 292 and a lower sheet or netting 294 of cardboard, fiberglass, fabric, impermeable polymeric sheet material, rope, netting, or other strengthening, water barrier, or rigidifying materials, the same or different, incorporated within the interior of the article during manufacture in any desired combination. The article 270 of FIG. 6a includes the powdered or granular material 20 incorporated over a central portion of the article, defined between the two internal sheet or netting materials 292 and 299. The article 280 of FIG. 6b includes the powdered or granular material in an upper portion of the article, above material 292, as well as in a central portion of the article 280, between material 292 and material 294. The article 290 of FIG. 6c includes the powdered or granular material 20 incorporated within a lower half of the article 290, filling a lower portion of the article 290 below material 294, and within a lower half of the central portion of article 290 between lower material 294 and upper material 292.

As shown in FIG. 7, the conveyor belts 228, 230 and 232 are shown in more detail to include a contoured upper surface 300 having uniformly shaped and contoured depressions for receiving dry particulate or granular material. The upper surfaces of the belts 228, 230 and 232 can be scraped by doctor blades 302, 304 and 306, respectively, so that a constant and precise amount of dry particulate or granular material will be applied to the loose mat 236 across the entire width of mat 236.

The webbing device 12 shown in more detail in FIG. 8 can be any known Garnett, carding machine or the like and is shown, for illustration purposes only, to include a number of rollers 308 that, in practice, include fingers (not shown) extending outwardly from an exterior surface of the rollers 308 to fluff and horizontally align the fibers into one or more webs of fiber 310, 312 that are combined from conveyors 312 and 314 before depositing the combined web onto the product conveyor 29, 62 or 234 (FIGS. 1, 3 and 4, respectively). The rollers 308 of webbing device 12 are supported on support frame 316.

In accordance with another important embodiment of the present invention, in addition to the water barrier characteristics of the articles of manufacture of the present invention, the articles may be manufactured to include instead, or in addition to the water-swellable clay, a material capable of removing, or interacting with, one or more water-soluble contaminants from the water penetrating the fibrous article.

Some of the most prevalent contaminants found in waste waters contained in ponds, lagoons, areas of subteranean structure and other water-releasing areas, particularly where these areas include industrial waste waters, are heavy metal ions and water-soluble organic materials. It is well known in the prior art that natural and synthetic zeolites are capable of removing a substantial portion of the heavy metal ions from a waste water solution and that organophilic clays are capable of removing water-soluble organic materials from solution. However, the prior art suggests that removal of these materials from waste water streams should be done on-stream, treating the entirety of the waste water stream in order to remove these materials, requiring frequent replacement of treating materials because of the heavy volumes of waste water stream that passes through the zeolites or passes through the organophilic clays in order to clarify these waste water streams. In accordance with an important feature of the present invention, it has been found that by including an organophilic clay with or without the water-swellable clay, such as bentonite, and/or applying the mixture of water-swellable clay with a zeolite or organophilic clay in filling the voids between fibers of the articles of manufacture of the present invention, the water-swellable clay will expand upon hydration and the zeolite and/or organophilic clay combined with the water-swellable clay will form a water-treatment material wherein the zeolite and/or organophilic clay will last many times longer than it would if the entire waste water supply were treated as in the prior art with full contact of the entire volume of the waste water stream, since only the quantity of water will be treated that permeates the water-swellable clay.

In accordance with another important embodiment of the present invention, the contaminant interacting material, comprising any contaminant-adsorbent, absorbent, reactant, or contaminant-neutralizing material can be supplied as a separate material below or intermixed with the water-swellable clay so that the amount of material treated for the removal of contaminants is only that material which penetrates the water-swellable clay.

In accordance with another important feature of the present invention, the contaminant-removal material mixed with the water-swellable clay, or supplied as a separate material below the clay can be any material capable of adsorbing, absorbing, or reacting with the contaminant for insolubilization or for neutralization of the contaminant, while keeping the contaminant water-soluble in order to substantially lessen or remove the contaminant characteristics of the contaminants originally present in the water contacting the article of manufacture. Examples of materials capable of removing or neutralizing contaminants that are present in water include absorbent fibers, such as microcrystalline cellulose; attapulgite clay; zinc rincinoleate absorbed on an absorbent fiber or other absorbent material; amorphous silica powder; synthetic calcium silicate; polyolefin pulp; sodium alumino-silicate (type A sodium zeolite); maltodextran; sodium silica aluminates (note that all the above are absorbents). Other materials, such as adsorbents include microcrystalline cellulose; silica hydrogel based compositions; attapulgites; synthetic sodium magnesium silicates; synthetic calcium silicates; silicon dioxide; acid activated clays; type A sodium zeolites; and the like provided as a separate layer or mixed with the absorbents and/or adsorbents. Other materials can be included such as an algicide, antimicrobial material, bactericide, disinfectant, and/or fungicides such as phenol; zinc undecylenate N.F.; acetyl tyridinium chloride N.F.X.III and the like.

Most preferred as the adsorbent, absorbent and/or reactant and/or neutralizing material are natural or synthetic zeolites and/or an organophilic clay which is basically a montmorillonite clay that has been reacted with a quaternary organic material to make it hyrophilic and absorbent to organic contaminants.

The fibers useful in forming the powdered or granular material-filled flexible articles of manufacture of the present invention are, for example, geotextile fibers, woven or non-woven, and the like. Any suitable fibers can be used for this purpose, particularly since the fibers have no water-impermeability purpose other than to achieve proper installation of a suitable amount of clay 16. Suitable fibers include fibers made from rayon, polypropylene, polyesters, nylon, acrylic polymers and copolymers, ceramic fiber, fiberglass, propylene-ethylene copolymers, polypropylene-polyamide copolymers, a single monofilament, polyethylene, polyurethane fibers, cotton, jute, dissolvable, e.g., polyvinyl alcohol fibers, and other natural and biodegradable fibers, such as straw, hay, cellulosic and the like. The preferred fiber length is in the range of about 0.5 to about 25 inches, more preferably about 1 to about 5 inches, and a preferred fiber denier is in the range of about 1 to about 5000, with a more preferred fiber denier of about 4 to about 500, and most preferably about 60 to about 200. The fibers used to manufacture geotextile fabrics are preferred for their bacteriological and chemical resistance but the fibers can be biodegradable since, once positioned, the fabric has little importance except as a means to install a water-absorbent material, e.g., bentonite clay and/or a polyacrylate superabsorbent polymer, in the proper position. In some installations, the thickness of the article is not important and such articles can be formed with any desired thickness, e.g., 3 mils to about 4 inches containing about 0.2 to about 30 pounds per square foot of water-absorbent material.

It has been found that by lubricating the water-swellable clay (bentonite) or fibers prior to needle punching the article together, preferably using approximately 2 ounces of water per square foot of article surface area, with a preferred bentonite clay loading of about 18 ounces of clay per square foot, the production speed can be increased with significantly less needle breakage, where needle punching is used as a consolidation step.

The lubrication of the clay or fiber results in faster and easier needle penetration and results in much less vibration being experienced by the articles of the present invention during manufacture. Vibration tends to cause the powdered or granular material to shift position and accumulate in localized lower areas of the article during manufacture, particularly during needle punching, and by lubricating the needle penetration, the vibration experienced during manufacture is substantially lessened, and the clay is more homogeneously dispersed throughout the fibers. Further, needle lubrication enables faster production due to the ease of needle penetration.

The amount of lubricant, e.g., water, should be at least about 0.1% based on the dry weight of the powdered or granular abrasive material, e.g., bentonite clay, and preferably is less than the amount which would necessitate an additional drying step, e.g., less than about 40% based on the dry weight of the abrasive material. The preferred amount of lubricant is about 5% to about 25% based upon the dry weight of the clay or other powdered or granular abrasive material being lubricated. Any method of wetting the clay can be used in accordance with the principles of the present invention. Best results are obtained by spraying the bentonite clay or other abrasive material with about 10% to about 20% water, based on the dry weight of the clay, especially about 10% to about 15% by weight water, based on the dry abrasive material weight, to avoid excessive weight in the finished product.

In accordance with another important embodiment of the present invention, shown in FIGS. 9, 10 and 11 an elongated, tube-like product can be manufactured that contains a powdered or granular material, such as bentonite clay, and that is ideally suited for sealing seams and overlaps between adjacent water barriers and is also suitable for sealing concrete seams, wall footings and other areas of potential water flow. As shown in FIG. 9, the clay feeder, such as shown in FIG. 7, can be modified to include spaced slits 320 such that the product formed includes spaced, parallel areas of clay containment 322 spaced by alternating areas of little to no clay 324 such that the product can be slit or sliced along the areas 324 of little to no clay containment to separate the product into a plurality of elongated tubular members 326, as best shown in FIG. 11.

In accordance with this embodiment of the present invention shown in FIGS. 9, 10 and 11, it is preferred that the fibers, prior to cutting or slicing, are needle punched, or otherwise consolidated together, substantially only along the areas 324 of little to no clay containment so that the water-swellable clay will easily extrude from the surfaces of the tubular product 326 upon water contact for effective sealing against the flow of water. Further, the cuts or slits made along the areas 324, where little or no clay is contained, can be positioned very close to the areas 322 containing the water-swellable clay so that the cutting line will be the weakest area on the product in order to provide a tubular article 326 wherein upon hydration, the clay contained within the article 326 will exude first through the area of weakening made during the manufacture (cutting) of the tube 326.

The tubes 326 can be cut to virtually any desired length, e.g., 1 foot to 100 feet. The tubes also can be manufactured by simply scraping the clay away from the areas 324 after the clay has fallen onto the fiber material. This could be accomplished, for example, by overlaying a bentonite clay-impervious material over the surface of the fibers to correspond with the areas 324 to prevent the clay from falling into the fibers thereunder. Regardless of the method of manufacturing the tubes 326, it is preferred that the tubes at their free ends 328 are heat sealed, sewn, glued or otherwise sealed to prevent the clay, or other powdered or granular material, from falling out of the ends 328. The tubes 326 are particularly well suited for sealing seams and overlaps of any type of water barrier material including the products of the present invention; layered materials such as those shown in the Clem U.S. Pat. No. 4,501,788 and the like; for sealing wall/footing joints; and any other area that may require a relatively large concentration of water-swellable clay for sealing purposes.

PRODUCT VARIATIONS

The above-described products of the present invention can be modified in a number of ways to suit various purposes and this adaptability of the products is one of the primary benefits when compared with water barriers of the prior art. For example, the products of the present invention can be loaded with a heavy material, such as a metal screen, or a water-insoluble powdered or granular material, e.g., a heavy mineral such as Barite, iron oxide or the like, relatively uniformly, together with a powdered or granular water-swellable clay so that the overall product has a specific gravity greater than 1.0 thereby enabling the material to submerge easily in water. Accordingly, the product can be applied to the soil surface at the bottom of a filled lagoon, waste containment area, and the like, without first draining the lagoon or waste containment area. The product containing a heavy mineral can be rolled out over the water or waste containment upper level and allowed to sink to cover the soil surface at the bottom of the water or liquid waste material, thereby saving substantial time, effort and expense in sealing a pre-existing lagoon, waste containment area, and the like, without first draining the lagoon or waste containment area.

In another embodiment, the products of the present invention can have incorporated therein a very light material such as expanded vermiculite or expanded perlite, so that the product has substantial buoyancy in water, liquid waste materials, and the like, to form a cover over a liquid waste containment area, such as a toxic waste lagoon, to prevent rain water from entering the waste containment area. One portion of this cover material can be adapted for removal or rolling back so that additional toxic waste and the like may be added to the covered containment area while maintaining a water-impervious cover to prevent further filling of the waste containment area with rain water.

The incorporation of thermoplastic fibers into the products of the present invention, enables the fibers to be compressed and heat sealed together for structural durability, instead of needle punching the fibers together. Further, a surface thickness of polyethylene or other geotextile, non-biodegradable fibers can be incorporated into the products of the present invention for use in environments where a surface of the product is exposed to atmospheric conditions, thereby preventing the products from degrading. The products can be manufactured to include a portion of heat-sealable fibers or the entire mat can be made of heat-sealable fibers that are heat-sealed together instead of needle punching thereby making the product less water-pervious for uses such as water barriers disposed adjacent to drainage structures, and the like.

In accordance with another embodiment, a portion or all of the fibers used in manufacturing the products of the present invention are water-degradable or water-dissolvable, e.g., polyvinyl alcohol fibers, such that after a predetermined water contact time, substantially only the powdered or granular material remains. The water-degradable or water-dissolvable fibers also can be selectively incorporated into the products of the present invention, for incorporation only along the edges of the product, where the products will be seamed or overlapped with another similar product, thereby dispersing the water-swellable clay into the seam areas upon hydration. Other filtering materials, such as activated carbon and the like, can be incorporated into the products, as well as various water-impermeable sheet materials, geogrids or polymeric netting materials, monofilaments, and other geotextiles, either woven or non-woven, can be incorporated within the interior of the product or on one or both exposed major surfaces to provide additional structural strength, and/or additional water-impermeability.

The products of the present invention can be essentially a single non-woven fabric material, so that it can elongate, where elongation is a desirable characteristic, while retaining the desired water barrier characteristics. Further, drainage structures and other articles used in the water barrier and water drainage arts can be virtually incorporated into the interior of this product during manufacture. Herbicides, bactericidal materials, tracer chemicals, various colorants that indicate contact with a particular chemical or class of chemicals, and the like, also can be incorporated into the articles of the present invention. Fertilizers can be incorporated in the interior or near an exposed surface of the products.

In another embodiment, fibers capable of dissolving upon contact with a solvent can be incorporated into the articles near one or more edges. After complete installation of the products containing solvent-dissolvable fiber, solvent can be applied at the seams or overlap areas to expose the water-swellable clay and to provide more effective sealing at the seam or overlap areas. The powdered or granular material can be a modified bentonite, such as a salt water-effective bentonite, an organophilic bentonite, and the like. The product is particularly effective in shored wall conditions for application against steel sheet piling; soldier beam and lagging; soldier beam and earth installations; concrete caissons; earthen stabilized wall structures and diaphram wall structures. In addition to the usual geotextile-type fibers, cellulosic fibers can be used as well as hay, straw, coconut fibers and fibers refined from wood chips and the like, particulary for use as an agricultural root zone liner to provide liquid feed for the promotion of plant growth. The products are also useful as gas barriers, particularly Radon gas barriers, to protect structures and containers above or below ground. Many other uses for the products of the present invention should be apparent to those skilled in the art.

The uses for the powdered or granular material-filled or partially-filled products of the present invention are virtually infinite since the product can be made completely flexible, relatively rigid or rigid and can be applied against very contoured and slopping surfaces, rough or smooth, as well as vertical surfaces, such as foundation walls, dams, along the sides of canals and below grades such as in tank farms, and for irrigation and water conservation techniques for below grade waterproofing and below grade lining materials under plaza decks, concrete and the like. The product has a substantial advantage in that space can be provided within the fabric structure for the expansion of a water-swellable clay such that wetting of the product disposed adjacent to concrete slabs and plaza decks will not cause buckling or cracking of the adjacent concrete or other structural members due to extensive water-swellable clay expansion. The products of the present invention permit the expanding clay to expand within the product, either laterally or vertically, or both, within space provided in the product to prevent undue forces from being applied to the adjacent surface of the concrete or other structural members.

The products of the present invention are substantially better than layered products having an intermediate layer of essentially pure water-swellable clay since the fabric of the present invention will not peel apart and the clay distributed among surrounding fiber has much less tendency to leak out of the product during handling and installation. Further, there is essentially no slippage of fabric with the products of the present invention since the product is, basically, a single non-woven fabric containing active material(s). The products also have a substantial advantage in being less likely to hydrate prematurely and, therefore, the products will not discintegrate during handling and installation if the product contacts water, such as during a rain fall prior to complete installation.

The products have a number of other advantages over the prior art layered products that include an upper and lower fabric surrounding an interior layer of bentonite clay since the products of the present invention are, essentially, a single fabric layer that can be filled or partially filled with any desired powdered or granular material, optionally including interior space for absorption of expansion of an interior water-swellable clay. The products of the present invention are particularly well suited for providing a water barrier in shored wall conditions to protect surface areas that are either vertical, sloped, and/or horizontal. The products are very durable because of the method of manufacture, since strength is not dependent upon any method of structurally securing two separate fabric layers together across an intermediate layer of bentonite clay. Such prior art layered products are significantly less durable than the products of the present invention because of their tendency to separate as a result of shear forces between top and bottom fabric layers, particularly where such layered products are installed over vertical or slopping surfaces, where shear forces are most prevalent.

The filled fabrics of the present invention also are particularly well suited for providing a water barrier beneath concrete that is sprayed in layers over the outer surface of the water barriers of the present invention, such as Shotcrete and Gunite concretes that are spray applied. In the Shotcrete and Gunite methods of applying concrete, the concrete composition is sprayed under substantial pressure onto a surface to be protected in a thin layer which drys almost instantaneously so that additional layers can be applied thereover to any desired thickness. The layered water barrier products of the prior art, having an intermediate clay layer glued or needle punched to two exterior fabric layers, do not have the structural strength and resistance to shear forces required to prevent the spray application of concrete from virtually forcing the intermediate clay layer out of the product, leaving very little to no water barrier capability. The products of the present invention include the water-swellable clay tightly held surrounding the fibers of a single fabric so that substantial pressure and force applied by a sprayed layer of concrete thereover will cause essentially no loss of water-swellable clay. Further, the products of the present invention absorb forces applied to the surface of the fabric so that the Shotcrete or Gunite spray applied concrete layers will not bounce off the products but will adhere to the fabric surface for efficient and economical application of concrete over the surface of the product while maintaining an effective water barrier thereunder.

Layered prior art water barrier products having upper and lower fabric materials and an intermediate layer of bentonite clay necessarily are characterized by slippage between the upper and lower fabric layers, particularly where the bentonite is wetted and becomes slippery due to the lubricant nature of bentonite clay. This slippage between upper and lower prior art fabric layers causes connecting fibers or glue between upper and lower fabric materials to be under constant tension transferring stress from the top fabric to the bottom fabric. This shear stress absorbed by the connecting fibers or glue between the upper and lower fabric sheets sometimes causes the layered products to virtually separate. Separation of the fabric of the present invention is almost impossible in any environment where the fabric would be useful as a water barrier.

The products of the present invention include a powdered or granular material, such as bentonite clay, securely bound in three dimensions rather than having an intermediate layer of clay secured in one direction, so that the fabrics disclosed herein lose essentially no powdered or granular material when cut into a desired size or shape or during handling and installation. Further, the fabrics manufactured as disclosed herein can be made to include an essentially unlimited loading of a powdered or granular material since the fabric can be manufactured in any desired thickness. Further, the products can be manufactured having no woven fabric material so that the higher frictional characteristic of the non-woven fabric of the present invention adds a desirable frictional holding property to the surfaces of the products.

In accordance with another important feature of the products of the present invention, premature hydration does not adversely affect the products since the fiber(s) essentially entirely encapsulate the powdered or granular material(s) therein. Any clay hydration that occurs in the products of the present invention does not cause separation of the fibrous material surrounding the water-swellable clay.

In accordance with another important feature of the present invention, the water-swellable clay will hydrate more quickly and dry out more slowly than a prior art layered product since fiber is contained in the product from the uppermost to the lowermost major surface to contain and maintain a desired distribution of water-swellable clay more evenly during hydration and dehydration. Further, a water-swellable clay in the products disclosed herein will not "pipe out" through the fabric to the extent that occurs in a layered product containing upper and lower fabrics and an intermediate layer of water-swellable clay.

It should be understood that the present disclosure has been made only by way of preferred embodiments and that numerous changes in details or construction, combination and arrangement of parts can be resorted to without departing from the spirit and scope of the invention as hereunder claimed.

What is claimed is:

1. An article of manufacture comprising a mat formed by incorporating a powdered or granular bentonite clay into a mat comprising a mass of fibers to blend the powdered or granular bentonite clay above, below and on each side of the fibers throughout at least a portion of a thickness of the mat and densifying and structurally consolidating the mat to secure the fibers in position surrounding or entraping or interlocking the bentonite clay to prevent substantial loss of the powdered or granular bentonite clay during handling and installation of the mat.

2. The article of claim 1, wherein the article is flexible and capable of being rolled upon itself.

3. The article of claim 1, wherein the fibrous mat is formed from fibers of a plurality of different materials.

4. The article of claim 1, wherein the article contains a weight ratio of bentonite clay to fiber within the range of about 1 to about 80 parts by weight of bentonite clay per part of fiber.

5. An article of manufacture comprising a mat formed by incorporating a powdered or granular material into a mat comprising a mass of fibers to blend the powdered or granular material above, below and on each side of the fibers throughout at least a portion of a thickness of the mat and densifying the structurally consolidating the mat to secure the fibers in position surrounding or entraping or interlocking the powdered or granular material to prevent substantial loss of the powdered or granular material during handling and installation of the mat;

wherein the article contains a weight ratio of powdered or granular material to fiber with the range of about 5 to about 20 parts by weight of powdered or granular material per part of fiber.

6. The article of claim 5, wherein the powdered or granular material comprises sodium bentonite clay.

7. An article of manufacture comprising a mat formed by incorporating a powdered or granular material into a mat comprising a mass of fibers to blend the powdered or granular material above, below and on each side of the fibers throughout at least a portion of a thickness of the mat and densifying and structurally consolidating the mat to secure the fibers in position surrounding or entraping or interlocking the powdered or granular material to prevent substantial loss of the powdered or granular material during handling and installation of the mat;

wherein the article contains a weight ratio of powdered or granular material to fiber with the range of about 8 to about 15 parts by weight of powdered or granular material per part of fiber.

8. The article of claim 7, wherein the powdered or granular material comprises sodium bentonite clay.

9. An article of manufacture comprising a mat formed by incorporating a powdered or granular material into a mat comprising a mass of fibers to blend the powdered or granular material above, below and on each side of the fibers throughout at least a portion of a thickness of the mat and densifying and structurally consolidating the mat to secure the fibers in position surrounding or entraping or interlocking the powdered or granular material to prevent substantial loss of the powdered or granular material during handling and installation of the mat; and an elongated reinforcing material aligned along the length of the article and encased therein between major upper and lower surfaces.

10. The article of claim 9, wherein the powdered or granular material comprises sodium bentonite clay.

11. An article of manufacture comprising a mat formed by incorporating a powdered or granular material into a mat comprising a mass of fibers to blend the powdered or granular material above, below and on each side of the fibers throughout at least a portion of a thickness of the mat and densifying and structurally consolidating the mat to secure the fibers in position surrounding or entraping or interlocking the powdered or granular material to prevent substantial loss of the powdered or granular material during handling and installation of the mat;

wherein the article includes a volume of a defined thickness containing essentially no powdered or granular material between fibers in said defined thickness such that the article is capable of venting gas laterally through said volume.

12. The article of claim 11, wherein the powdered or granular material comprises sodium bentonite clay.

13. The article of claim 11, wherein the article includes a water-absorbent powdered or granular material filling a portion of the mat, and the article includes a concentration of fibers throughout a thickness of the article disposed under the water-absorbent material, wherein the fiber concentration has essentially no powdered or granular material.

14. A method of manufacturing a fabric at least partially filled with a powdered or granular material dispersed throughout at least a portion of a thickness of the fabric comprising:

depositing fibers onto a support surface to form a loose mat of fibers having spaces between adjacent fibers;

depositing the powdered or granular material among the fibers such that the powdered or granular material is received in a portion of said spaces between adjacent fibers;

compressing the fibers together to eliminate a substantial portion of said spaces that are not filled with said powdered or granular material; and securing the fibers together while the fibers are in the compressed state to structurally consolidate the fibers together and form a partially filled fabric and to lock the powdered or granular material in position between said fibers;

wherein the fibers are secured together by needle punching a portion of the fibers to intertangle the fibers together sufficiently to structurally consolidate the fibers into a handleable fabric.

15. The method of claim 14, wherein a portion of the fibers is thermoplastic and tacky when heated to a fiber melt temperature, and wherein the fibers are secured together by heating the fibers sufficiently to tackify the fibers such that adjacent contacting fibers adhere together, and thereafter cooling the tackified fibers to a temperature below the melt temperature while the adjacent, adhered fibers are in contact with each other.

16. The method of claim 14, wherein the fibers are adhesively secured together.

17. The method of claim 14, wherein the weight ratio of powdered or granular material to fibers is in the range of about 1 to about 80 to 1.

18. The method of claim 14, wherein the fibers are continuous monofilaments.

19. The method of claim 14, wherein the powdered or granular material comprises sodium bentonite clay.

20. The method of claim 14, wherein the powdered or granular material is a water-absorbent material.

21. The method of claim 14, wherein the fibers have a length within the range of about 0.5 inch to about 25 inches.

22. The method of claim 21, wherein the fibers have a denier of about 1 to about 5000.

23. The method of claim 14 further including the step of applying a sealing material to at least one major surface of the fabric to reduce the loss of powdered or granular material during handling and installation of the fabric.

24. The method of claim 23, wherein the sealing material is a flexible sheet material.

25. The method of claim 24, wherein the flexible sheet material is a water-impermeable sheet material.

26. A method of manufacturing a fabric at least partially filled with a powdered or granular material dispersed throughout at least a portion of a thickness of the fabric comprising:

depositing fibers onto a support surface to form a loose mat of fibers having spaces between adjacent fibers;

depositing the powdered or granular material among the fibers such that the powdered or granular material is received in a portion of said spaces between adjacent fibers;

compressing the fibers together to eliminate a substantial portion of said spaces that are not filled with said powdered or granular material; and securing the fibers together while the fibers are in the compressed state to structurally consolidate the fibers together and form a partially filled fabric and to lock the powdered or granular material in position between said fibers;

wherein the weight ratio of powdered or granular material to fibers is in the range of about 5 to about 20 to 1.

27. The method of claim 26, wherein the powdered or granular material comprises sodium bentonite clay.

28. A method of manufacturing a fabric at least partially filled with a powdered or granular material dispersed throughout at least a portion of a thickness of the fabric comprising:

depositing fibers onto a support surface to form a loose mat of fibers having spaces between adjacent fibers;

depositing the powdered or granular material among the fibers such that the powdered or granular material is received in a portion of said spaces between adjacent fibers;

compressing the fibers together to eliminate a substantial portion of said spaces that are not filled with said powdered or granular material; and securing the fibers together while the fibers are in the compressed state to structurally consolidate the fibers together and form a partially filled fabric and to lock the powdered or granular material in position between said fibers;

wherein the fibers are secured together by sewing the fibers together.

29. A method of manufacturing a fabric at least partially filled with a powdered or granular material dispersed throughout at least a portion of a thickness of the fabric comprising:

depositing fibers onto a support surface to form a loose mat of fibers having spaces between adjacent fibers;

depositing the powdered or granular material among the fibers such that the powdered or granular material is received in a portion of said spaces between adjacent fibers;

compressing the fibers together to eliminate a substantial portion of said spaces that are not filled with said powdered or granular material; and securing the fibers together while the fibers are in the compressed state to structurally consolidate the fibers together and form a partially filled fabric and to lock the powdered or granular material in position between said fibers;

wherein the powdered or granular material is bentonite clay.

30. A method of manufacturing a fabric at least partially filled with a powdered or granular material dispersed throughout at least a portion of a thickness of the fabric comprising:

depositing fibers onto a support surface to form a loose mat of fibers having spaces between adjacent fibers;

depositing the powdered or granular material among the fibers such that the powdered or granular material is received in a portion of said spaces between adjacent fibers;

compressing the fibers together to eliminate a substantial portion of said spaces that are not filled with said powdered or granular material; and securing the fibers together while the fibers are in the compressed state to structurally consolidate the fibers together and form a partially filled fabric and to lock the powdered or granular material in position between said fibers;

wherein the weight ratio of powdered or granular material to fibers is in the range of about 8 to about 15 to 1.

31. The method of claim 30, wherein the powdered or granular material comprises sodium bentonite clay.

32. A method of manufacturing a fabric at least partially filled with a powdered or granular material dispersed throughout at least a portion of a thickness of the fabric comprising:

depositing fibers onto a support surface to form a loose mat of fibers having spaces between adjacent fibers;

depositing the powdered or granular material among the fibers such that the powdered or granular material is received in a portion of said spaces between adjacent fibers;

compressing the fibers together to eliminate a substantial portion of said spaces that are not filled with said powdered or granular material;

securing the fibers together while the fibers are in the compressed state to structurally consolidate the fibers together and form a partially filled fabric and to lock the powdered or granular material in position between said fibers; and securing a layer of a rigid material to the fabric to form a fabric capable of standing vertically against a wall prior to securing the fabric against said wall.

33. The method of claim 32, wherein the powdered or granular material comprises sodium bentonite clay.

34. The method of claim 32, wherein the rigid material is applied to an interior of the fabric, between fibers, during the manufacture of the partially filled fabric.

35. The method of claim 34 including the steps of:

depositing lower fibers onto a support surface to form a loose mat of lower fibers above the support surface;

depositing said rigid material over said loose mat of fibers;

depositing upper fibers over said rigid material; and depositing powdered or granular material surrounding said upper fibers.

36. The method of claim 35, including the step of depositing a sheet of polymeric netting onto one of the outer surfaces of the fabric.

37. The method of claim 35, wherein said rigid material is a sheet of corrugated cardboard that is substantially coextensive with said mat of lower fiber.

38. A method of impeding the flow of Radon gas comprising disposing an article of manufacture comprising a mat of fibers having a powdered or granular material distributed among the fibers throughout at least a portion of a thickness of the article and consolidated sufficiently to prevent substantial loss of the powdered or granular material during handling and installation between the Radon gas and an area to be protected from said gas.

39. The method of claim 38, wherein the powdered or granular material comprises sodium bentonite clay.

40. A water submersible article of manufacture comprising a mat of fibers having a first powdered or granular material distributed among the fibers throughout at least a portion of a thickness of the article and consolidated sufficiently to prevent substantial loss of the first powdered or granular material during handling and installation, wherein the article further is loaded with a heavy, water-insoluble powdered or granular material distributed relatively uniformly to provide an overall mat specific gravity greater than 1.0.

41. The article of claim 40, wherein the first powdered or granular material is bentonite clay.

42. An article of manufacture that is buoyant in water comprising a mat of fibers having a powdered or granular material distributed among the fibers throughout at least a portion of a thickness of the article and consolidated sufficiently to prevent substantial loss of the powdered or granular material during handling and installation, wherein the article further includes a buoyant material distributed essentially coextensive with a major surface of the article to provide buoyancy of the entire article on water.

43. The article of claim 42, wherein the article has a specific gravity less than about 0.90.

44. The article of claim 42, wherein the buoyant material is selected from the group consisting of expanded perlite and expanded vermiculite.

45. The article of claim 42, wherein the powdered or granular material is bentonite clay.

* * * * *

UNITED STATES PATENT AND TRADEMARK OFFICE
CERTIFICATE OF CORRECTION

PATENT NO.  :  5,237,945
DATED       :  AUGUST 24, 1993
INVENTOR    :  ALEC W. WHITE

It is certified that error appears in the above-identified patent and that said Letters Patent is hereby corrected as shown below:

Column 13, lines 50-51, after "article" and before "preferably" insert -- surface area, --; and Column 18, line 35, after "tubes" insert -- 326 --.

Signed and Sealed this

Twenty-sixth Day of July, 1994

Attest:

BRUCE LEHMAN

*Attesting Officer*  *Commissioner of Patents and Trademarks*